(12) United States Patent  
Ishikawa (10) Patent No.: US 8,960,416 B2  
(45) Date of Patent: Feb. 24, 2015

(54) GRIP WIDTH ADJUSTING MECHANISM

(71) Applicant: General Packer Co., Ltd., Aichi (JP)

(72) Inventor: Shinji Ishikawa, Aichi (JP)

(73) Assignee: General Packer Co., Ltd., Aichi (JP)

( * ) Notice: Subject to any disclaimer, the term of this patent is extended or adjusted under 35 U.S.C. 154(b) by 52 days.

(21) Appl. No.: 14/021,578

(22) Filed: Sep. 9, 2013

(65) Prior Publication Data

US 2014/0332352 A1    Nov. 13, 2014

(30) Foreign Application Priority Data

May 10, 2013    (JP) .................................. 2013-099770

(51) Int. Cl.
  *B65G 47/86*    (2006.01)
  *B65B 35/00*    (2006.01)
(52) U.S. Cl.
  CPC .............. *B65G 47/842* (2013.01); *B65B 35/00* (2013.01)
  USPC .................................. 198/803.7; 198/867.05
(58) Field of Classification Search
  CPC .............................. B65G 47/842; B65G 47/86
  USPC ......................................... 198/803.7, 867.05
  See application file for complete search history.

(56) References Cited

U.S. PATENT DOCUMENTS

| | | | | |
|---|---|---|---|---|
| 3,593,837 | A * | 7/1971 | Loomis, Jr. ................ | 198/418.5 |
| 5,536,357 | A * | 7/1996 | Kovacs ......................... | 156/566 |
| 6,629,403 | B1 * | 10/2003 | Tisma ............................. | 53/502 |
| 2005/0220599 | A1 * | 10/2005 | Job et al. ...................... | 414/626 |
| 2012/0319416 | A1 * | 12/2012 | Ellis et al. .................... | 294/183 |

FOREIGN PATENT DOCUMENTS

JP    2005-119727 A    5/2005

* cited by examiner

*Primary Examiner* — Gene Crawford  
*Assistant Examiner* — Thomas Randazzo  
(74) *Attorney, Agent, or Firm* — Cermak Nakajima & McGowan LLP; Tomoko Nakajima (57) ABSTRACT

Disclosed is a grip width adjusting mechanism incorporated in a packaging machine having a grip unit. The grip width adjusting mechanism includes a plurality of grip width adjusting plates disposed at the steps and set with distances between the guide rail and the grip width adjusting plates according to the work content of the steps, respectively and a grip width adjusting lever having a distal end having a grip width adjusting roller abutting against each grip width adjusting plate by a biasing force of the spring, respectively. The grip width adjusting lever is located on either one of the arms so as to be rotated with the arm. A rotational movement angle of the grip width adjusting lever is set according to the distance between the guide rail and the grip width adjusting plate, with the result that the grip width is adjusted.

2 Claims, 7 Drawing Sheets

GRIP WIDTH ADJUSTING MECHANISM

CROSS-REFERENCE TO RELATED APPLICATIONS

This application is based upon and claims the benefit of priority from the prior Japanese Patent Application No. 2013-099770 filed on May 10, 2013, the entire contents of which are incorporated herein by reference.

BACKGROUND

1. Technical Field

The present disclosure relates to a grip width adjusting mechanism which adjusts a grip width that is a distance between a pair of grips grasping a packaging bag while suspending the packaging bag according to work contents of each step in a successive packaging process executed by a packaging machine.

2. Related Art

A grip unit having a pair of grips gasping a side edge of a packaging bag has conventionally been configured to be capable of adjusting a distance (hereinafter, "grip width") between the paired grips in a successive packaging process executed by a packaging machine according to a bag width of a packaging bag to be treated.

Japanese Patent Application Publication No. JP-A-2005-119727 discloses a grip pair opening adjusting device in a packaging machine. When a handle is operated to rotationally move an adjusting lever in a forward direction, a holder linked to the adjusting device is rotated outward about a support pin, whereby the grip pair is opened. When the adjusting lever is rotationally moved in a reverse direction, the holder is rotated inward, whereby the grip pair is closed.

However, the opening adjusting device and the grip unit paired with the opening adjusting device are linked to each other. More specifically, when 4 to 16 grip units are provided on a rotating body in a radial arrangement, for example, the adjusting devices whose number is the same as that of the grip units are required.

Accordingly, firstly, when the grip width is initially set according to the bag width of the packaging bag to be treated, the initial setting needs to be executed for every grip unit individually. As a result, there is a possibility that an actual value adjusted for every grip unit would vary relative to the initially set value of grip width.

Secondly, in a feeding step where packaging bags are fed to the packaging step, a filling step where the packaging bags are filled with an article and a sealing step where the packaging bags are sealed, the grip width is adjusted according to each step in order that a funnel or the like may smoothly be inserted into a bag mouth and/or rucks may be prevented from being produced on a part of the packaging bag near the bag mouth. In this case, when the initial set value varies as described above, there is a possibility that the variations enlarge and spread in the successive packaging process. Furthermore, when an electric motor is installed for every adjusting device so that the grip width may be continuously be changed automatically, the adjusting devices and motors need to be individually controlled according to each step of the packaging process. Since a plurality of motors is provided, there is a possibility that a synchronous control and wiring of the motors require a complicate configuration. Since the motors consume electrical power, there is a possibility that large load is applied to the environment.

SUMMARY

Therefore, an object of the present disclosure is to provide a grip width adjusting mechanism which can reduce a grip width adjusting time and can uniform the grip width of each grip unit in each step executed by a packaging machine.

The present disclosure provides a grip width adjusting mechanism incorporated in a packaging machine which has a grip unit including a base movably attached to a guide rail, a pair of arms mounted to the base so as to be rotationally movable, a pair of grips provided on distal ends of the arms to grasp a side edge of the packaging bag near a bag mouth and suspend the packaging bag, respectively, a link which links both arms so that the arms are rotationally moved in opposite directions, and a spring biasing the arms in respective directions opposite each other. A plurality of steps is provided along the guide rail and the grip unit is intermittently moved from one step to another. The grip width adjusting mechanism adjusts a grip width according to a work content of each step. The grip width is a distance between the grips. The grip width adjusting mechanism comprises a plurality of grip width adjusting plates disposed at the steps and set with distances between the guide rail and the grip width adjusting plates according to the work content of the steps, respectively and a grip width adjusting lever having a distal end having a grip width adjusting roller abutting against each grip width adjusting plate by a biasing force of the spring, respectively, the grip width adjusting lever being provided on either one of the arms so as to be rotated with said one arm. In the grip width adjusting mechanism, a rotational movement angle of the grip width adjusting lever is set according to the distance between the guide rail and the grip width adjusting plate, whereby the grip width is adjusted.

According to the above-described mechanism, a grip width is adjusted according to the distance between the guide rail and the grip width adjusting plate against which the grip width adjusting roller provided on the distal end of the grip width adjusting lever abuts by the biasing force of the spring provided on the arm.

Furthermore, the grip width adjusting plate is set at the predetermined distance from the guide rail thereto according to each step executed by the packaging machine.

Consequently, the construction can be simplified to that the grip width is adjusted by the grip width adjusting plate and the grip width adjusting lever having the grip width adjusting roller following the grip width adjusting plate, with the result that a time period of grip width adjustment can be reduced.

Furthermore, the grip width adjusting plates are disposed at the respective steps and the grip unit having the grip width adjusting roller rolling on the grip width adjusting plate is moved along the guide rail. While a plurality of grip units is sequentially moved on the grip width adjusting plate, a rotational movement angle of the grip width adjusting lever of one grip unit becomes the same as a rotational movement angle of the grip width adjusting lever of another grip unit at each step, the grip width can be equalized. Consequently, the grip widths of the grip units can be rendered uniform in the steps executed by the packaging machine respectively.

In one embodiment, each grip width adjusting plate is provided so that the distance between the guide rail and the grip width adjusting plate is variably adjustable.

According to the construction of the above-described embodiment, the distance between the guide rail and each grip width adjusting plate is variably adjustable. As a result, when the position of each grip width adjusting plate is adjusted, the grip width can uniformly be adjusted with respect to a plurality of grip units of the packaging machine. Consequently, the time period of grip width adjustment can be reduced.

Furthermore, the grip widths required at the respective steps relative to the bag width of the packaging bag can collectively be adjusted by the grip width adjusting plates disposed at the respective steps. Consequently, the grip widths of the grip units can be rendered uniform at the respective steps executed by the packaging machine even when the position of the grip width adjusting plate has been adjusted.

DETAILED DESCRIPTION

One embodiment of the grip width adjusting mechanism will be described with reference to the accompanying drawings. A packaging machine 1 to which the grip width adjusting mechanism of the embodiment is applied includes guide rails 1A, 1B, 1C and 1D which include two linear sections 1a and generally semicircular curved sections 1b connecting ends of the linear sections 1a and are formed into a truck type. A plurality of guide units 11 is provided at regular intervals on the guide rails 1B and 1C. The packaging machine 1 is constructed to stop the grip unit 11 to execute a predetermined work at each one of sequential steps including a feeding step where packaging bags are fed one by one with a bag mouth up, an opening step where the bag mouth of the packaging bag is opened, a filling step where the packaging bag is filled with an article, a deaeration step where remaining air is removed from the packaging bag, a sealing step where the bag mouth is closed, while intermittently moving the grip units 11 in the horizontal direction along the guide rails 1B and 1C.

Figure 2:
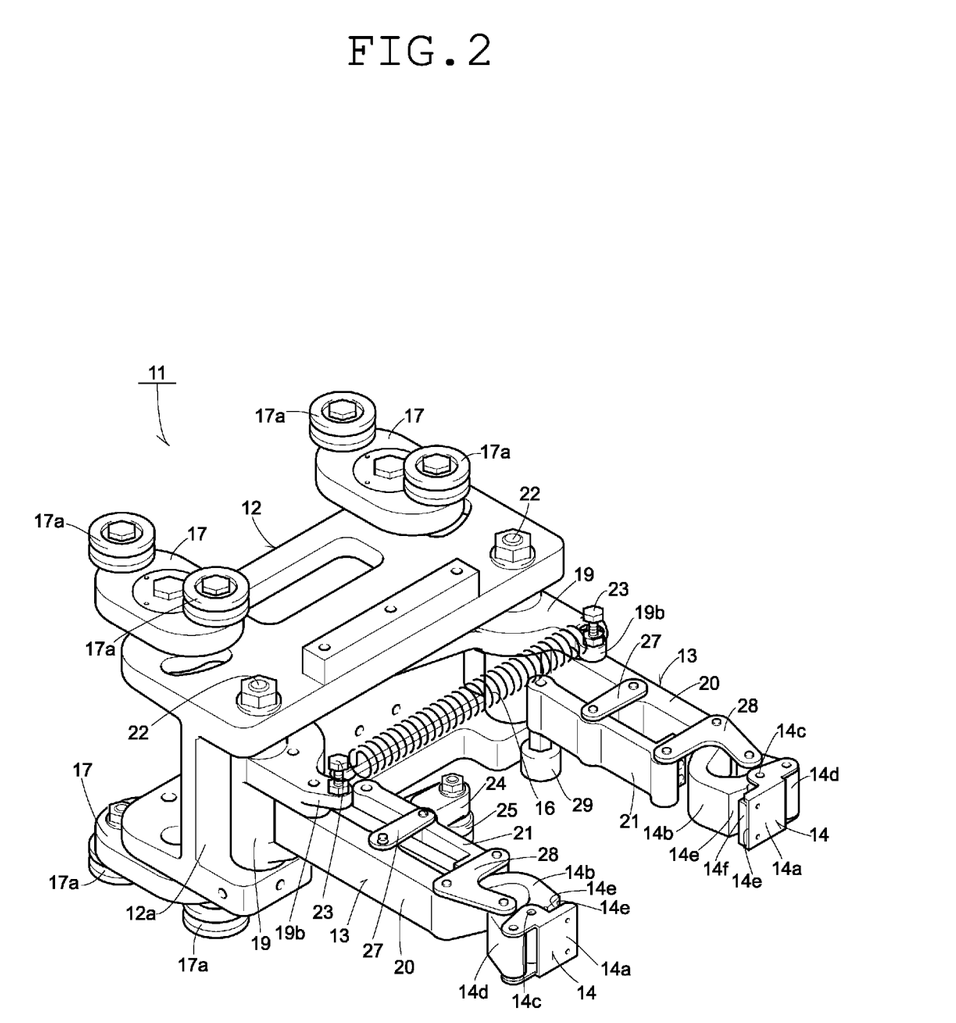
FIG. 2 is a schematic perspective view of the construction of the grip unit provided with the grip width adjusting mechanism according to the embodiment.
Figure 3:
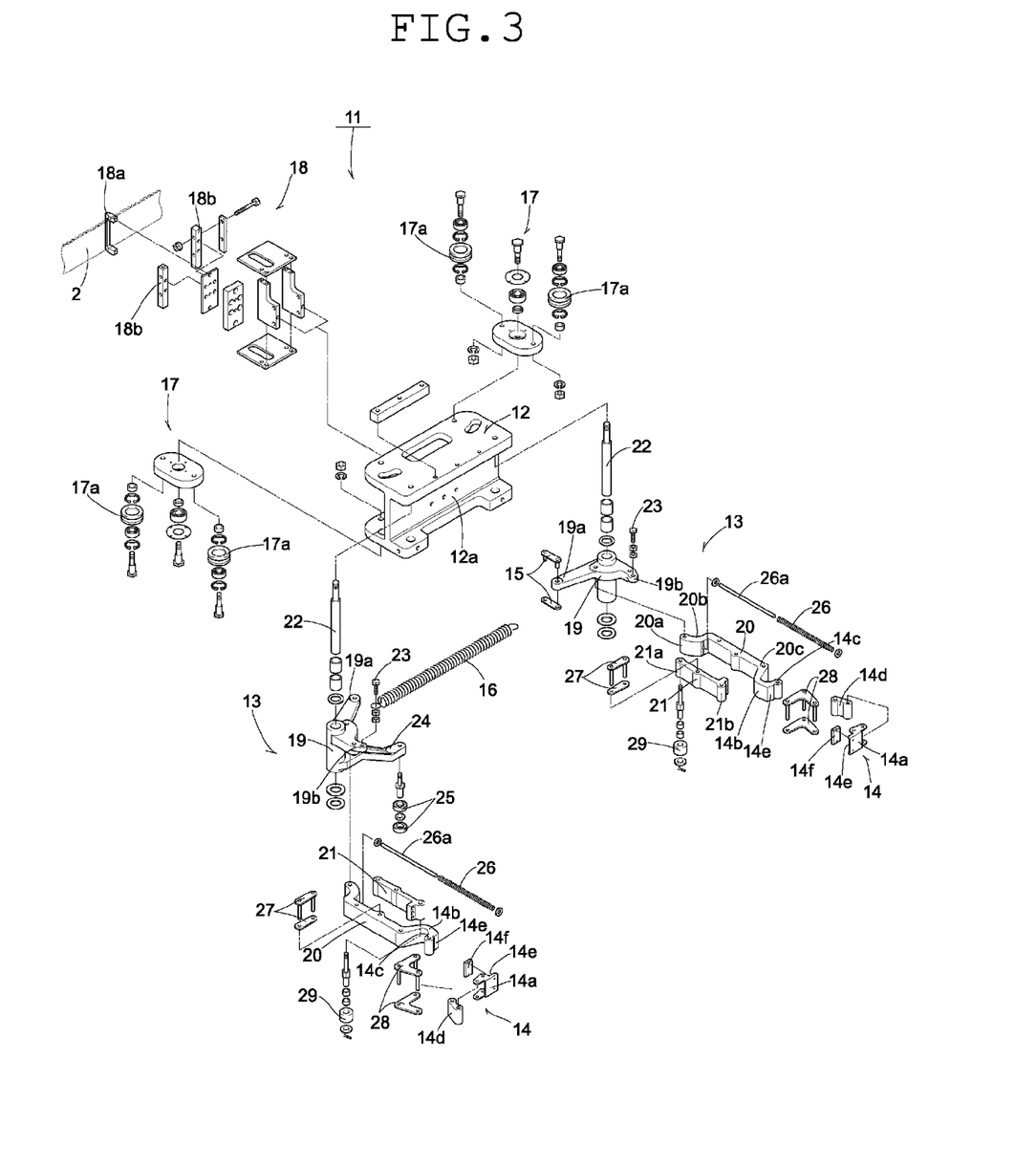
FIG. 3 is a schematic exploded perspective view of the construction of the grip unit provided with the grip width adjusting mechanism according to the embodiment.
Figure 4:
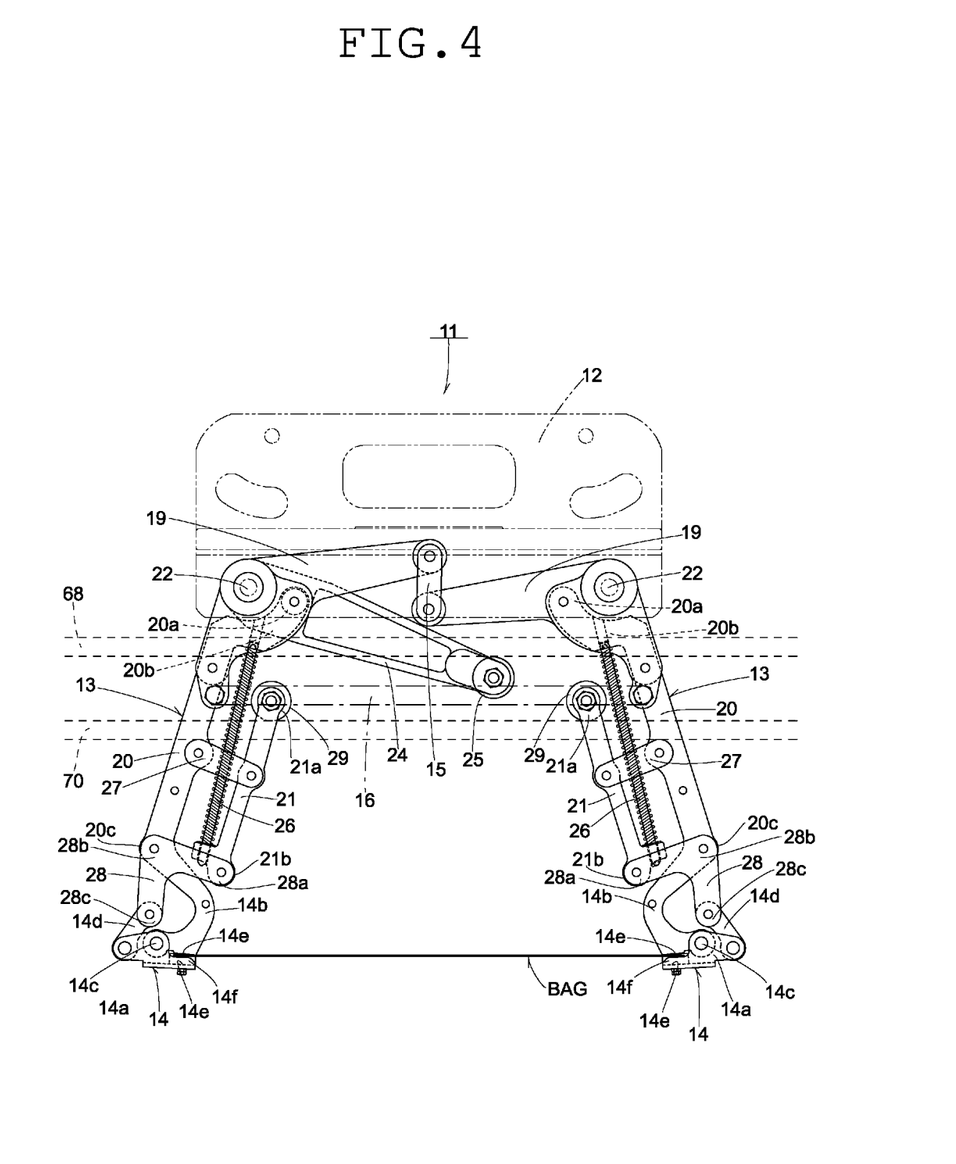
FIG. 4 is a schematic plan view of the construction of the grip unit provided with the grip width adjusting mechanism according to the embodiment.

Although the truck type packaging machine including two linear portions 1a is shown in the embodiment, the packaging machine may be constructed into a generally triangular shape, a square shape with round corners or another polygonal shape in a planar view by increasing the linear sections. Furthermore, the grip width adjusting mechanism of the embodiment is applicable to rotary type packaging machines having annular guide rails under a predetermined condition that a packaging bag to be used should not be changed. The condition includes a case where only one type of packaging bag is used in a packaging machine using only one type of packaging bag and a case where all the standards of packaging bags are unified Each grip unit 11 includes a base 12, an arm 13, a grip 14, a link 15 and a main spring 16 as shown in FIGS. 2 to 4. The base 12 has four engagement portions 17 which are located on parts of an upper surface and an underside thereof near right and left rear ends and which are engaged with the guide rails 1B and 1C. Each engagement portion 17 has a pair of guide rollers 17a which hold the guide rails 1B and 1C therebetween from both sides of the guide rails. When the guide rails 1B and 1C are held between the guide rollers 17a, the base 12 is movably attached to the guide rails 1B and 1C, whereby the base 12 is horizontally movable in a stable manner along the guide rails 1B and 1C.

The base 12 has a rear end surface provided with a belt attachment 18 as shown in FIG. 3. The belt attachment 18 has a generally C-shaped belt clamp 18a holding a conveyance belt 2 from both sides of the conveying belt and a pair of clamp receiving members 18b each formed into a prismatic shape. As a result, the base 12 can be fixed to the conveyance belt 2. Accordingly, when the conveyance belt 2 is moved in a predetermined direction, the base and accordingly the grip units 11 can be moved along the guide rails 1B and 1C. A pair of arms 13 are mounted to right and left ends of the front of the base 12 so as to be rotationally movable. Each arm 13 includes an arm holder 19, a main arm 20 and a sub-arm 21. The arms 13 are connected to each other by the link 15 and the main spring 16 so as to perform a predetermined rotational movement.

Each arm holder 19 is formed into a generally L-shape on a planar view as shown in FIGS. 3 and 4. Each arm holder 19 has a through hole formed in a bent portion of the L-shape thereof. An arm shaft 22 is inserted into each through hole, whereby each arm holder 19 is rotationally movable about the arm shaft 22 relative to the base 12. The arm holders 19 have respective ends 19a connected to each other by the link 15 as shown in FIGS. 3 and 4.

When the link 15 is moved forward, the arm holders 19 are rotationally moved in directions opposite to each other, whereby the other ends 19b of the arm holders 19 are moved in a direction such that the other ends 19b are departed from each other. On the other hand, when the link 15 is moved backward, the ends 19b of the arm holders 19 are moved in a direction such that the ends 19b come close to each other. Thus, the forward and backward movement of the link 15 can be converted to the rotational movement of the arms 13 in opposite directions.

Two locking screws 23 are provided on the ends 19b of the arm holders 19 for locking the main spring 16 to the arm holders 19, respectively. The main spring 16 biases the ends 19b of the arm holders 19 so that the ends 19b are rotationally moved in directions such that the ends 19b come close to each other. As a result, the arms 13 are biased inward so as to be rotationally movable thereby to come close to each other.

Either one of the arm holders 19 has a grip width adjusting lever 24. In the embodiment, the left arm holder 19 is formed with the grip width adjusting lever 24 as shown in FIG. 2. The grip width adjusting lever 24 is formed so as to protrude from the arm shaft 22 inward between the arm holders 19. Consequently, the grip width adjusting lever 24 is rotationally movable together with the arm holder 19 and accordingly the arm 13.

The grip width adjusting lever 24 has a distal end on which a grip width adjusting roller 25 is supported so as to be rotationally movable. The grip width adjusting roller 25 is subjected to the biasing force of the main spring 16 thereby to abut against a grip width adjusting plate 68 which will be described in detail later. A grip width can be maintained at a constant value while the grip width adjusting roller 25 is rolling on the grip width adjusting plate 68, abutting against the grip width adjusting plate 68. Furthermore, when the location of the grip width adjusting plate 68 is caused to come close to and to be departed from the guide rails 1B and 1C of the packaging machine 1, the grip width adjusting roller 25 abuts against the grip width adjusting plate 68 to follow the grip width adjusting plate 68. Accordingly, the grip width adjusting lever 24 can be caused to follow the grip width adjusting plate 68 to the location of the grip width adjusting plate 68. As a result, the rotational movement of the arms 13 together with the grip width adjusting lever 24 can be controlled, as will be described in detail later.

The main arms 20 are mounted to the arm holders 19 so as to be rotationally movable within a predetermined range, respectively. The sub-arms 21 are located inside the main arms 20 opposed to each other. A sub-spring 26 is provided between the main arms 20 and the sub-arms 21. Furthermore, the main arms 20 and the sub-arms 21 are connected to each other by a midway provided arm link 27 and a grip opening/closing lever 28 provided on a distal end.

Each main arm 20 has a proximal end 20a which is mounted on the arm holder 19 so as to be rotationally movable. Each main arm 20 has a curved portion 20b which is formed so as to be connected to the proximal end 20a. The curved portion 20b is curved from the proximal end 20a outside each main arm 20 so that an inner surface thereof extends along the arm shaft 22. As a result, a range of rotational movement of each main arm 20 is limited by abutment against the inner surface of the curved portion 20b. Accordingly, even when inadvertent shock or the like flips each main arm 20 outward, each main arm 20 can be prevented from spreading, whereby the grips 14 grasping the packaging bag can be prevented from being disengaged from the side edge of the packaging bag. This can prevent the packaging bag from dropping off.

Each main arm 20 has a distal end 20c to which a grip holder 14b is formed so as to be connected. The grip holder 14b is folded inward with respect to the main arm 20 and thereafter curved outward thereby to be generally formed into an S-shape. The grip holder 14b has a distal end formed with a through hole through which the grip opening/closing shaft 14c is inserted. The grips 14 will be described in detail later.

Each sub-arm 21 has a proximal end 21a on which a grip release roller 29 is mounted so as to be rotationally movable and a distal end 21b formed with a through hole through which a shaft (not shown) is inserted in order that a generally L-shaped grip opening/closing lever 28 may be mounted via a shaft (not shown) on the distal end 21b so as to be rotationally movable. Each sub-arm 21 can be moved substantially in parallel with the main arm 20 by the grip opening/closing lever 28 and the arm link 27. Each sub-spring 26 provided between the main arm 20 and the sub-arm 21 is configured to bias the sub-arm 21 forward. Furthermore, a sub-spring shaft 26a is inserted through the sub-spring 26 and has one end abutting against the proximal end 20a of the main arm 20 and the other end abutting against the distal end 21b of the sub-arm 21.

The grip 14 includes a grip body 14a, a grip holder 14b which is formed on the distal end of the main arm 20 so as to be connected to the distal end, a grip opening/closing shaft 14c, a grip opening/closing lever 28 configured to open and close the grip, a grip opening/closing link 14d configured to open and close the grip in cooperation with the grip opening/closing lever 28, and a pair of grip surfaces 14e grasping a side edge of the packaging bag.

The grip body 14a is formed so as to be rotationally movable about the grip opening/closing shaft 14c. The grip body 14a has one end formed with one of the grip surfaces 14e and the other end connected to the grip opening/closing lever 28 by the grip opening/closing link 14d. The grip holder 14b has a distal end near which the other grip surface 14e is formed. The grip opening/closing shaft 14c is inserted through the through hole formed in the distal end of the grip holder 14b. The grip opening/closing shaft 14c connects the grip body 14a and the grip holder 14b to each other and supports the grip body 14a so that the grip body 14a is rotationally movable.

The grip opening/closing lever 28 is constructed of a generally L-shaped flat plate. The grip opening/closing lever 28 has one end 28a which is connected to the distal end 21b of the sub-arm 21 so as to be rotationally movable as shown in FIG. 4. The grip opening/closing lever 28 also has a folded portion 28b which is connected to the distal end 20c of the main arm 20 so as to be rotationally movable. The grip opening/closing lever 28 further has the other end 28c which is connected to the grip opening/closing link 14d so as to be rotationally movable. When the grip opening/closing lever 28 is rotationally moved, the grip body 14a supported on the grip opening/closing shaft 14c is rotationally moved, whereby the grip surfaces 14e can be opened and closed.

Either one or both of the grip surfaces 14e are provided with respective non-slip members 14f made of a material such as rubber, silicon or a material similar to rubber or silicon. As a result, the side edge of the packaging bag can reliably be grasped.

The forward and backward movement of each sub-arm 21 is converted to the opening and closing operation of the grip 14. The grip 14 is maintained in a closed state by the biasing force of each sub-spring 26. More specifically, as shown in FIG. 4, when the end 28a of the grip opening/closing lever 28 is biased via each sub-arm 21 by the sub-spring 26, the other end 28c of the grip opening/closing lever 29 is configured to push the grip opening/closing link 14d obliquely forward. As a result, since the grip opening/closing link 14d pushes the other end of the grip body 14a, the grip surfaces 14e are closed with the grip opening/closing shaft 14c serving as a fulcrum. Consequently, the grips 14 can grasp the predetermined positions of both side edges of the packaging bag.

On the other hand, each sub-arm 21 is configured to be pulled backward when the grip release roller 29 mounted on the proximal end 21a thereof abuts against the grip release plate 70 thereby to roll on a grip release plate 70. The grip release plate 70 is located in front of the grip width adjusting plate 68 so as to be spaced from the grid width adjusting plate 68 by a predetermined distance. The grip release plate 70 will be described in detail later.

When the sub-arm 21 is pulled backward against the biasing force of the sub-spring 26, the other end 28c of the grip opening/closing lever 28 is rotationally moved inward, whereby the grip opening/closing link 14d is pulled by the end 28c of the grip opening/closing lever 28. Consequently, the grip surfaces 14e are opened with the grip opening/closing shaft 14c serving as the fulcrum with the result that both side edges of the packaging bag are released from the grasp of the grips 14.

The grips 14 constructed as described above is configured to be opened as quickly as possible when the sub-arm 21 is pulled backward. As a result, the packaging bag can be fed quickly and the packaging bag grasped by the grips 14 can quickly be released from grasp on termination of the packaging process.

Figure 5:
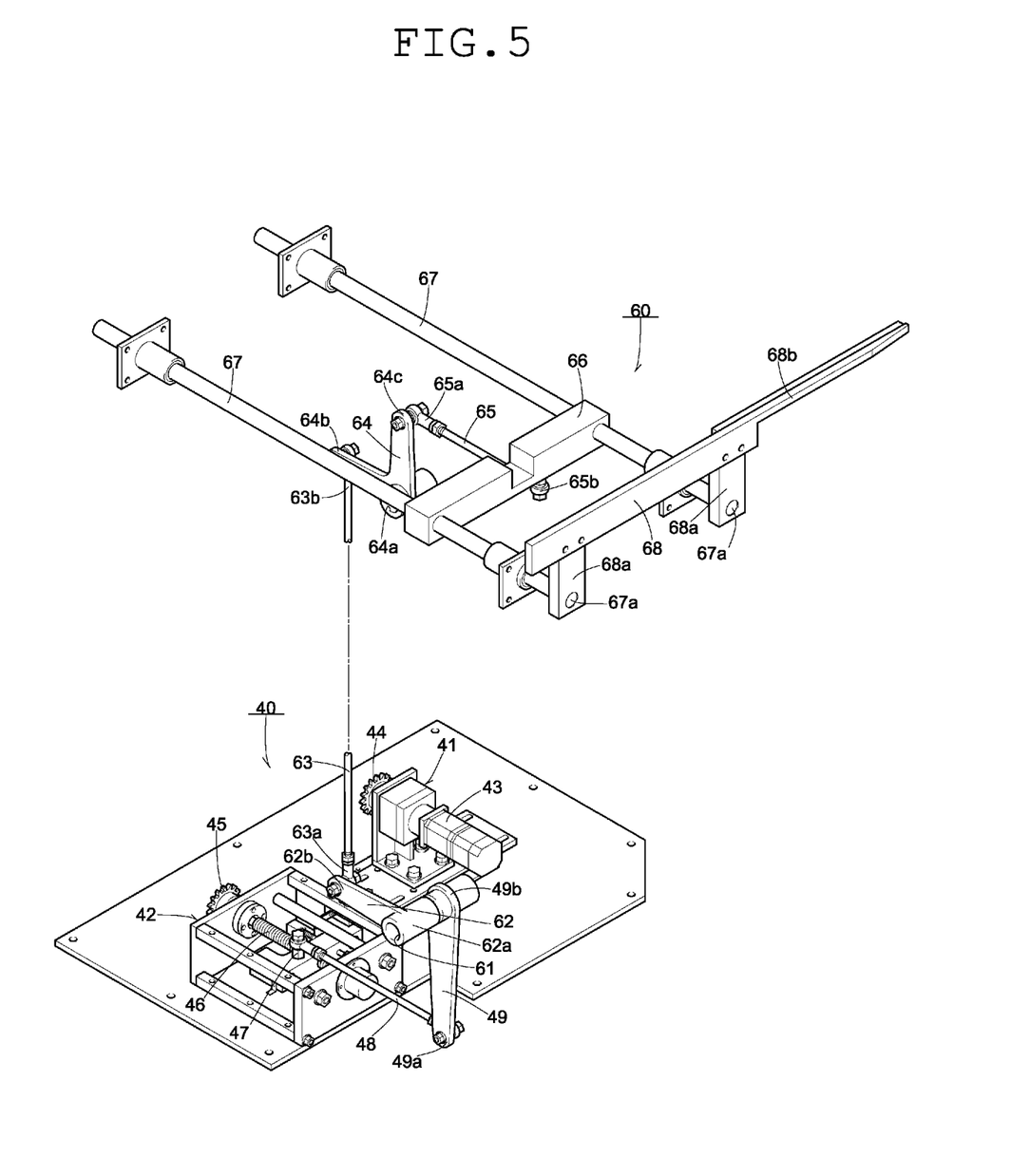
FIG. 5 is a schematic perspective view of the constructions of a base unit and a link unit both adjusting the position of a grip width adjusting plate of the grip width adjusting mechanism according to the embodiment.

Each grip unit 11 is constructed as described above. The base unit 40 and the link unit 60 both adjusting the position of the grip width adjusting plate will be described with reference to the accompanying drawings. FIG. 5 schematically illustrates the construction of the base unit 40 and the link unit 60 of the grip width adjusting mechanism 10 of the embodiment. The base unit 40 has an adjusting unit which adjusts the grip width. The adjusting unit includes a drive unit 41 and a transmission unit 42. The drive unit 41 includes an electric motor 43 controlled by a control unit (not shown) and a first gear 44 configured to be coaxial with a rotating shaft of the motor 43 and to be rotationally movable in forward and reverse directions. The drive unit 41 is also configured to generate power to adjust the grip width.

The control unit is connected to the drive unit 41 via an electric telecommunication line (not shown) that is wired or wireless. The control unit is configured to control the grip width according to predetermined conditions such as a width of the packaging bag to be fed, a type of the packaging bag and the like. Thus, the operation of the motor 43 can automatically be controlled according to programmed predetermined conditions. Accordingly, since a time period required for adjustment of the grip width can be reduced to a large extent, a personal cost and time complexity spent on the adjustment can drastically be suppressed.

Furthermore, a solenoid switch or an actuator similar to the solenoid switch may be employed instead of the above-described motor 43. Furthermore, a handle may be provided for manually driving the first gear 44, instead of the motor 43. This can suppress costs associated with the motor 43 and is accordingly advantageous when the type of the packaging bag used in the packaging process is not changed frequently.

The transmission unit 42 is configured to transmit power generated by the drive unit 41 to the link unit 60. The transmission unit 42 includes a second gear 45 to which power is transmitted via the first gear 41 of the drive unit 41 and a chain (not shown), a ball screw 46 which is coaxial with the second gear 45 and is rotationally movable, a base rod 48 connected via a nut 47 to the ball screw 46 and a base lever 49 having a lower end to which the base slot 48 is connected.

The second gear 45 has a predetermined gear ratio relative to the first gear 44. The nut 47 is configured to move rearward along the ball screw 46 when the second gear 45 is rotationally moved in the forward direction. As a result, the base rod 48 and the lower end 49a of the base lever 49 can be pulled rearward. On the other hand, the nut 47 is also configured to move forward along the ball screw 46 when the second gear 45 is rotationally moved in the reverse direction. As a result, the base rod 48 and the lower end 49a of the base lever 49 can be pushed out forward. The base lever 49 has an upper end 49b connected to a connecting shaft 61 of the link unit 60.

The link unit 60 is formed by combining a plurality of rods and a plurality of levers together and configured to transmit drive power generated by the base unit 40 to the grip unit 11. The link unit 60 includes the connecting shaft 61, a first lever 62, a first rod 63, a second lever 64, a second rod 65, a connecting block 66, a slide bar 67 and a grip width adjusting plate 68.

The connecting shaft 61 is configured to connect the base lever 49 and the first lever 62 to each other so that these levers 49 and 62 make a substantially right angle, as shown in FIG. 5. As a result, the front-back movement of the lower end 49a of the base lever 49 can be converted to the up-down movement of a rear end 62b of the first lever 62.

Figure 7:
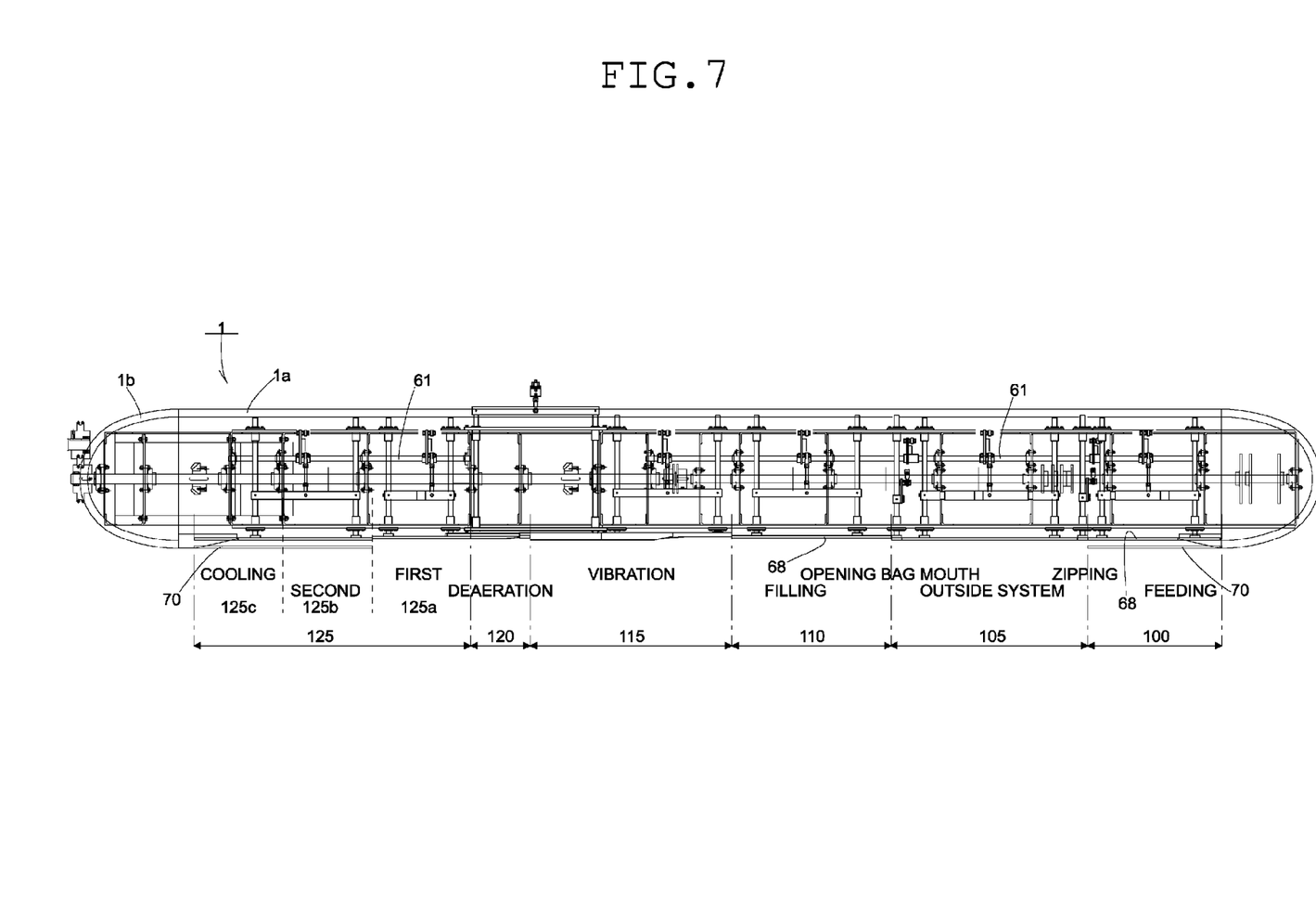
FIG. 7 schematically illustrates an operation of the grip width adjusting mechanism in a truck type packaging machine according to the embodiment.

Furthermore, the connecting shaft 61 extends along the linear portion 1a of the guide rails 1B and 1C and connects a single base unit 40 and a plurality of link units 60 in a skewered manner, as shown in FIG. 7. As a result, the single base unit 40 can simultaneously drive a plurality of link units 60. Thus, since an adjustment width of the plural link units 60 can be uniformed, the grip width can quickly be changed from a bag width of one packaging bag to a bag width of another packaging bag in the packaging process, while a variation rate of a previous grip width and another subsequent grip width with respect to a stepwise changing grip width according to work contents of each step.

The first lever 62 has a front end 62a which is connected to the connecting shaft 61 so as to make a substantially right angle to base lever 49. The first lever 62 also has a rear end 62b which is connected to a lower end 63a of the first rod 63. The first lever 62 is configured to be rotationally movable about the connecting shaft 61. The first lever 62 converts the front-back movement of the base lever 49 to the up-down movement, transmitting the up-down movement to the first rod 63. The first rod 63 has a lower end 63a connected to a rear end 62b of the first lever 62 and an upper end 63b connected to the second lever 64.

The second lever 64 is generally formed into an L-shape and has a through hole formed in a folded portion of the L-shape. A second lever shaft 64a is inserted through the hole. As a result, the second lever 64 is configured to be rotationally movable about the second lever shaft 64a. The second lever 64 converts up-down movement of one end 64b thereof to front-back movement of the other end 64c thereof, further transmitting the front-back movement to the second rod 65.

The second rod 65 has a rear end 65a connected to the end 64c of the second lever 64 and a front end 65b connected to the connecting block 66. The second lever shaft 64a may extend along the linear portion 1a of the guide rails 1B and 1C of the truck type packaging machine 1 in the same manner as the connecting shaft 61 and may connect a plurality of link units 60 to each other in a skewered manner.

The connecting block 66 is formed into the shape of a substantially rectangular columnar extending in the right-left direction and has right and left ends near which respective through holes are formed. A pair of slide bars 67 are inserted through the respective holes to be fixed. The front-back movement is transmitted from the second rod 65 to the connecting block 66, which further transmits the front-back movement to the slide bars 67.

The slide bars 67 have front ends 67a provided with a grip width adjusting plate 68. The grip width adjusting plate 68 is constructed of a flat plate extending in the right-left direction and has a rear face on which a pair of holding blocks 68a are mounted with a predetermined distance therebetween. The grip width adjusting plate 68 is mounted via the holding blocks 68a to the slide bars 67. The grip width adjusting plate 68 has a predetermined length according to the work contents of each step in the packaging process of the packaging machine 1. As a result, a predetermined grip width can be retained from start to end of each step.

The grip width adjusting plate 68 includes a guide plate 68b which is formed so as to extend from one end side thereof. The grip width adjusting lever 24 of the grip unit 11 and the grip width adjusting roller 25 can smoothly be guided onto the grip width adjusting plate 68 by the guide plate 68b. The guide plate 68b may be eliminated when it is unnecessary depending upon the work contents of each step of the packaging process. When the slide bars 67 are moved in the front-back direction, the grip width adjusting plate 68 is moved according to an amount of displacement of the slide bars 67. The grip width adjusting plate 68 has a front surface against which the grip width adjusting roller 25 of the grip unit 11 abuts thereby to be rollable.

Figure 6:
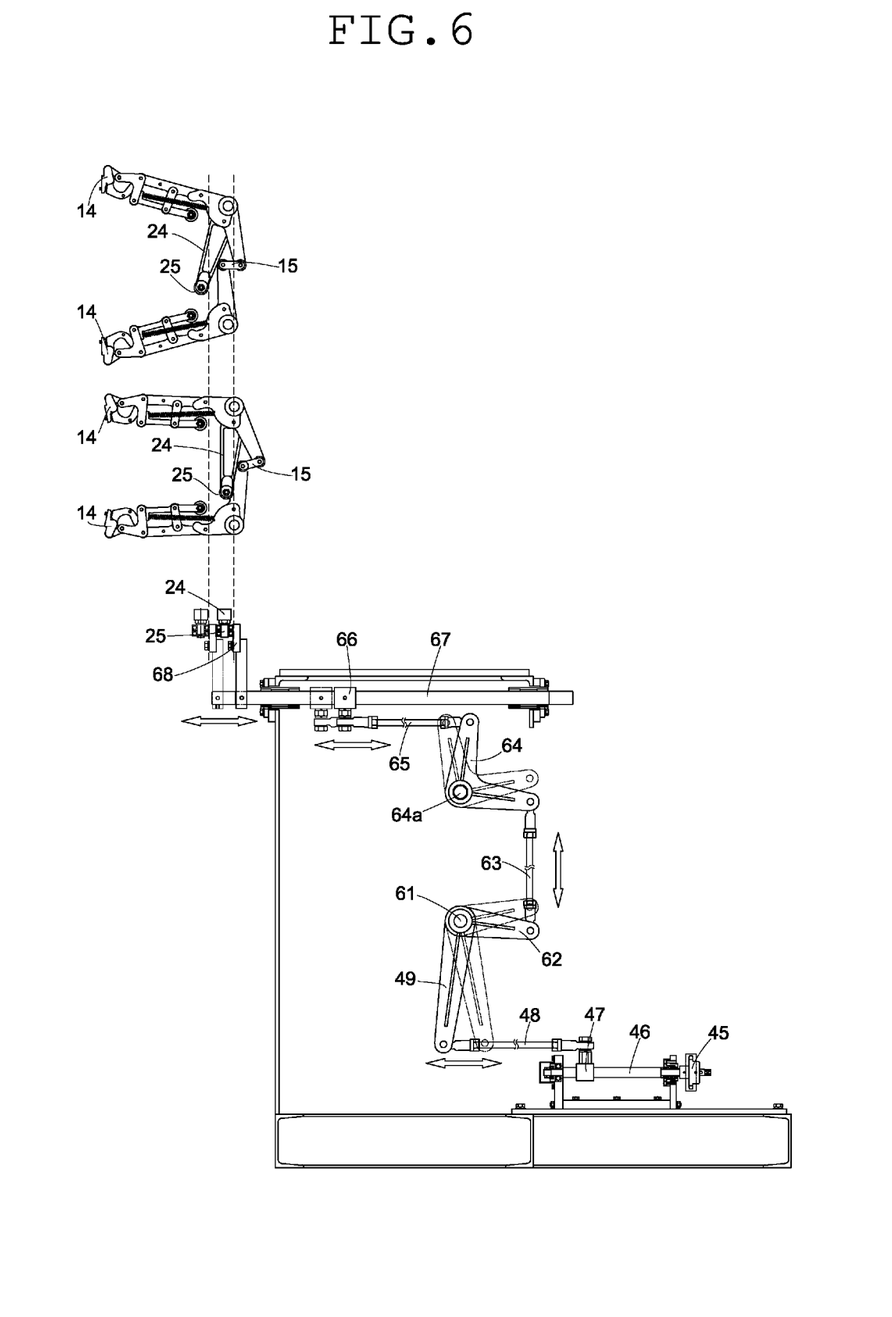
FIG. 6 schematically illustrates an operation of the grip width adjusting mechanism according to the embodiment.

The grip width adjusting mechanism 10 of the truck type packaging machine 1 according to the embodiment is constructed as described above. The operation of the grip width adjusting mechanism 10 will now be described with reference to the drawings. FIG. 6 schematically illustrates an operation of the grip width adjusting mechanism 10 of the embodiment.

The grip width adjusting mechanism 10 is configured to adjust the grip width according to the rotational movement of the first gear 44 of the drive unit 41 of the base unit 40 in the forward and reverse directions. When the first gear 44 is rotationally moved in the forward direction, the second gear 45 connected to the first gear 44 by the chain is also rotationally moved in the forward direction.

Upon forward rotational movement of the ball screw 46, the nut 47 threadingly engaging the ball screw 46 is moved rearward (rightward in FIG. 6) along the ball screw 46. As a result, the base rod 48 connected to the nut 47 is pulled rearward. The lower end 49a of the base lever 49 is also pulled rearward when the base rod 48 is pulled.

When the lower end 49a of the base lever 49 is pulled rearward, the upper end 49b of the base lever 49 rotationally moves the connecting shaft 61 by a predetermined angle from the rear to the front. Thus, upon rotational movement of the connecting shaft 61, the rear end 62b of the first lever 62 is moved upward thereby to push the lower end of the first rod 63 upward by a predetermined distance. The upwardly pushed first rod 63 pushes upward one end 64b of the second lever 64 connected to the upper end 63b of the first rod 63.

Since the second lever 64 is configured to convert the up-down movement to the front-back movement, the other end 64c of the second lever 64 pushes the second rod 65 forward. The second rod 65 then pushes forward the connecting block connected thereto, thereby pushing forward the slide bar 67 fixed to the connecting block 66. As a result, the grip width adjusting plate 68 fixed to the front end 67a of the slide bar 67 is pushed forward. Accordingly, when the first gear 44 is rotationally moved forward, the grip width adjusting plate 68 is moved forward, whereby the distance between the guide rails 1B and 1C and the grip width adjusting plate 68 can be adjusted in the direction such that the grip width adjusting plate 68 is departed from the guide rails 1B and 1C.

Dotted lines in FIG. 6 show a difference between the position of the grip width adjusting plate 68 as shown by solid line and that of the grip width adjusting plate 68 as shown in by two-dot chain line. When the grip width adjusting plate 68 is pushed forward in the manner as described above, the front surface of the plate 68 can push forward the grip width adjusting lever 24 against which the grip width adjusting roller 25 abuts.

When the grip width adjusting lever 24 is pushed forward, the end 19b of one arm holder 19 rotationally movable together with the grip width adjusting lever 24 is rotationally moved outward, and the end 19b of the other arm holder 19 connected to the link 15 and configured to be rotationally movable in the reverse direction is rotationally moved so as to depart from the end 19b of the one arm holder 19. As a result, the main arms 20 connected to the respective arm holders 19 are also rotationally moved so as to depart from each other.

Accordingly, when the grip width adjusting lever 24 is pushed forward, the arms 13 are rotationally movable about the arm shafts 22 in the directions such that the arms 13 depart from each other, respectively. In other words, since the grips 14 mounted on the distal ends of the arms 13 are moved in the directions such that the grips 14 depart from each other, respectively, the grip width can be adjusted in a direction such that the grip width is spread or increased.

On the other hand, upon reverse rotational movement of the first gear 44, the rods and the levers are moved in the direction opposed to that in the forward rotational movement of the first gear 44. The grip width adjusting plate 68 is retracted rearward. At this time, the force of the main spring 16 pulling the arms 13 toward inside locations opposed to each other becomes larger than the pressing force by which the grip width adjusting plate 68 biases the grip width adjusting lever 24 forward. As a result, the grip width between the grips 14 is reduced, and the ends 19b of the arm holders 19 pulling via the locking screw 23 the main spring 16 are pulled inward. The grip width adjusting lever 24 is configured to rotationally move together with one arm holder 19. The grip width adjusting roller 25 formed on the distal end of the lever 24 is biased to the grip width adjusting plate 68 by the spring force of the main spring 16.

Accordingly, when the grip width is increased or decreased, the grip width adjusting roller 25 is configured to normally abut against the grip width adjusting plate 68 thereby to roll. Consequently, while the grip width adjusting roller 25 of the grip unit 11 is rolling on the grip width adjusting plate 68, the grip width of the grips 14 can be maintained at a predetermined value, whereupon the grip width of a plurality of grip units 11 sequentially passing over the grip width adjusting plate 68 can be rendered uniform.

According to the above-described grip width adjusting mechanism 10, the grip width is adjusted by the grip width adjusting plate 68 moved in the front-back direction and the grip width adjusting lever 24 following the forward-backward movement of the grip width adjusting plate 68. As a result, when the size of the packaging bag used with the packaging machine 1 and in particular, the bag width are to be changed, the motor 43 is driven according to the conditions the data of which has been supplied to the control unit, whereby the width between the grips 14 can automatically be changed, and the time required for adjustment of the grip width with the change in the bag width can be finished in a shorter time period.

Figure 1:
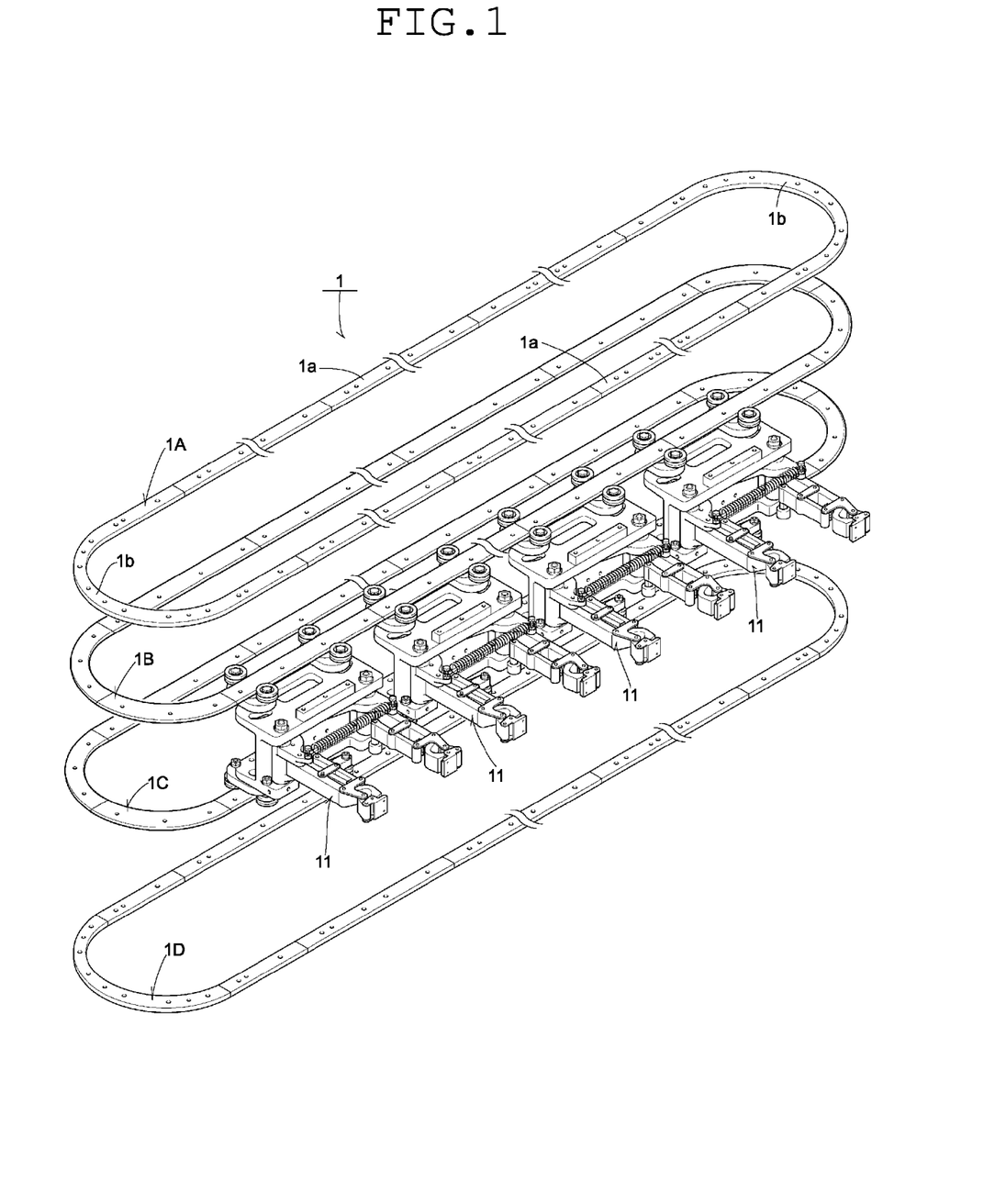
FIG. 1 is a schematic perspective view of the construction of a packaging machine having a grip unit provided with a grip width adjusting mechanism according to one embodiment.

The above-described operation is directed to setting an initial value of the grip width between the grips 14 according to the width of the packaging bag used with the truck type packaging machine 1 as shown in FIG. 1 or 7.

The following describes the operation in the case where a plurality of grip units 11 and a plurality of link units 60 both constituting the grip width adjusting mechanism 10 are installed in the truck type packaging machine 1. FIG. 7 schematically illustrates the operation of the grip width adjusting mechanism 10 in the truck type packaging machine 1. The grip unit 11 is configured to move along the guide rails 1B and 1C as shown in FIG. 1.

In the truck type packaging machine 1 of the embodiment as shown in FIG. 7, the packaging bag is moved from the right step 100 to the left step 125. Step 100 is a feeding step where packaging bags are fed one by one to the grip units 11. In the feeding step, a grip opening plate 70 is provided in front of the grip width adjusting plate 68 in parallel with the plate 68. The grip release roller 29 is mounted on the rear end of the sub-arm 21 of the grip unit 11. The sub-arm 21 is configured to be pulled backward when the release roller 29 abuts against the rear surface of the grip opening plate 70 to roll. As a result, the grip surfaces 14e of the grips 14 can be opened.

Upon end of step 100, the terminal end of the grip opening plate 70 is provided so that the grip surfaces 14e are closed as soon as possible. As a result, the grips 14 can grasp predetermined positions of the both side edges of the packaging bag.

Step 105 is an inspection step where it is inspected whether or not the grips 14 grasping the packaging bag correctly grasp the both side edges of the packaging gap within a predetermined range. The packaging bag is discharged from the packaging process when the bag is not within the predetermined range.

Step 110 is a step where the packaging bag grasped by the grips 14 is filled with article. A work for opening the bag mouth of the packaging bag is firstly carried out at step S110. A predetermined position of the grip width adjusting plate 68 at step 110 side is set to be rear relative to the grip width adjusting plate 68 at the step 105 side. As a result, the grip width of the grips 14 is rendered narrower than the grip width at the feeding step. Accordingly, since apart of the packaging bag around the bag mouth can be rendered more flexible, the bag mouth can easily be opened. The grip unit 11 is moved to the subsequent step 115 when having ended the predetermined work at step S110. The article with which the packaging bag is filled at step 110 includes a granular body such as dog food or palletized briquette coal or pulverized body such as wheat flour. The article may be a liquid or gelled semisolid.

Step 115 is a shaping step where vibration is applied to the packaging bag so that the packaging bag is uniformly filled with the article and is easily stacked one after another in the transportation. For these purposes, since the whole packaging bag firstly needs to be relaxed, the position of the grip width adjusting plate 68 at step 115 is set to be rear relative to that of the grip width adjusting plate 68 at step 110. Subsequently, at step 115, while vibration is being applied to the article, the packaging bag is gradually pressed from both sides until the packaging bag reaches a predetermined thickness, whereby the packaging bag is shaped. Furthermore, portions of the packaging bag near the bag mouth are gradually pulled from both sides. Accordingly, the grip width adjusting plate 68 is formed into such a tapered shape that the grip width adjusting plate 68 gradually protrudes forward. As a result, since the grip width of the grips 14 is gradually spread, the width of the portion of the bag near the bag mouth can gradually be increased.

Step 120 is a deaeration step where air remaining in gaps of the article is quickly removed from the shaped packaging bag. Step 120 is provided with a section where the grip width adjusting plate 68 is instantaneously interrupted. Since the grip width is instantaneously narrowed in this step, the bag mouth can be loosened for a moment in order that a deaeration nozzle may be inserted into the packaging bag.

The connecting shaft 61 is discontinuous between the previous step 115 where the packaging bag is vibrated and step 120. Accordingly, the vibration applied to the packaging bag in step 115 can be prevented from having an impact on the packaging bag at the deaeration step, and the article filling the packaging bag can be laid when drifting in the packaging bag.

Step 125 is a sealing step where the bag mouth of the packaging bag is closed. At step 125a, the bag mouth is temporarily closed, and the bag mouth is heat-sealed at step 125b. The portion of the packaging bag near the bag mouth is cooled at step 125c. Upon end of step 125, the packaging bag is detached from the grip unit 11. At the temporary sealing step 125a, the position of the grip width adjusting plate 68 is set to assume the same position as at step 100. This can prevent occurrence of rucks on the bag mouth of the packaging bag after deaeration. At the heat seal step 125b, the grip width adjusting plate 68 is set to be located forward relative to the position thereof at the temporary sealing step 125a. The grip opening plate 70 is disposed alongside the grip width adjusting plate 68. As a result, the grips 14 can release both side edges of the packaging bag while operating to spread the grip width outside the packaging bag grasped by the grips 14. Accordingly, when the packaging bag is heat-sealed, a portion of the packaging bag near the upper end thereof is strongly pulled at both sides of the packaging bag and thereafter, the packaging bag can be sealed linearly to both side edges thereof. Furthermore, the grip unit 11 can quickly be detached from the packaging bag so that the heat-sealing work is prevented from being encumbered by the grip unit 11.

The grip unit 11 having completed the step 125 is detached from the grip width adjusting plate 68 and passes one of the curved portions 1b of the guide rail and the rear linear portion 1a, returning to step 100 through the other curved portion 1b.

According to the above-described grip width adjusting mechanism, the connecting shaft 61 connecting the base unit 40 and the link unit 60 to each other is divided between a section from step 100 to step 115 and a section starting from step 125 so as to have one base unit 40 in the section from the feeding step to the vibrating step and another base unit 40 in the section to the sealing step. Consequently, the grip width can be adjusted individually at the feeding side and at the sealing side. This can accurately adjust levels of grasp of the grips grasping the packaging bag at the feeding side, in the temporary sealing process at the sealing side and in the heat-sealing work.

Furthermore, since the connecting shaft 61 is divided between the feeding step side and the sealing step side, the vibration applied to the packaging bag in the vibrating step of step 115 is transferred to the connecting shaft 61 through the grip unit 11 and the grip width adjusting plate 68, whereupon the vibration can be prevented from having an impact on the packaging bag at the sealing step where precision work is required.

According to the above-described grip width adjusting mechanism 10 in the truck type packaging machine 1, the grip width adjusting roller 25 mounted on the distal end of the grip width adjusting lever 24 abuts against and rolls on the front surface of the grip width adjusting plate 68, and the grip width adjusting lever 24 is moved forward and backward following the grip width adjusting plate 68. As a result, when a plurality of grip units 11 are moved on the guide rails 1B and 1C, the grip widths of the respective grip units 11 can automatically be adjusted according to the grip width adjusting plate 68 which is set so as to assume a predetermined position according to each step of a successive packaging process.

The length of the grip width adjusting plate 68 provided according to each step can be set based on the time required for a predetermined work executed at each step and a speed at which the grip unit 11 is fed along the guide rails 1B and 1C. The grip width between the grips 14 can remain constant while the grip unit 11 is passing the grip width adjusting plate 68. As a result, the grip width can be uniformed with respect to the grip units 11 passing the steps one after another with the result that the working efficiency can be improved. Furthermore, since occurrence of defective products can be suppressed as much as possible and the yield can be improved, the supply of products can be stabilized.

The foregoing description and drawings are merely illustrative of the present disclosure and are not to be construed in a limiting sense. Various changes and modifications will become apparent to those of ordinary skill in the art. All such changes and modifications are seen to fall within the scope of the appended claims.

What is claimed is:

1. A grip width adjusting mechanism incorporated in a packaging machine which has a grip unit including:
   a base movably attached to a guide rail;
   a pair of arms mounted to the base so as to be rotationally movable;
   a pair of grips provided on distal ends of the arms to grasp a side edge of the packaging bag near a bag mouth and suspend the packaging bag, respectively;
   a link which links both arms so that the arms are rotationally moved in opposite directions; and a spring biasing the arms in respective directions opposite each other, wherein a plurality of steps is provided along the guide rail and the grip unit is intermittently moved from one step to another, the grip width adjusting mechanism adjusting a grip width according to a work content of each step, the grip width being a distance between the grips, the grip width adjusting mechanism comprising:

a plurality of grip width adjusting plates disposed at the steps and set with distances between the guide rail and the grip width adjusting plates according to the work content of the steps, respectively; and a grip width adjusting lever having a distal end having a grip width adjusting roller abutting against each grip width adjusting plate by a biasing force of the spring, respectively, the grip width adjusting lever being provided on either one of the arms so as to be rotated with said one arm, wherein a rotational movement angle of the grip width adjusting lever is set according to the distance between the guide rail and the grip width adjusting plate, whereby the grip width is adjusted.

2. The grip width adjusting mechanism according to claim 1, wherein each grip width adjusting plate is provided so that the distance between the guide rail and the grip width adjusting plate is variably adjustable.

* * * * *